(12) United States Patent
Bunzel et al.

(10) Patent No.: US 11,181,280 B2
(45) Date of Patent: Nov. 23, 2021

(54) DOOR FOR A DOMESTIC APPLIANCE

(71) Applicant: ELECTROLUX APPLIANCES AKTIEBOLAG, Stockholm (SE)

(72) Inventors: Volkmar Bunzel, Rothenberg ob der Tauber (DE); Dietmar Hildner, Rothenberg ob der Tauber (DE); Peter Hoffmann, Rothenberg ob der Tauber (DE); Branko Ivanovic, Rothenberg ob der Tauber (DE); Erhard Käser, Rothenberg ob der Tauber (DE)

(73) Assignee: Electrolux Appliances Aktiebolag, Stockholm (SE)

( * ) Notice: Subject to any disclaimer, the term of this patent is extended or adjusted under 35 U.S.C. 154(b) by 488 days.

(21) Appl. No.: 16/091,895

(22) PCT Filed: Apr. 7, 2017

(86) PCT No.: PCT/EP2017/058386
§ 371 (c)(1),
(2) Date: Oct. 5, 2018

(87) PCT Pub. No.: WO2017/178366
PCT Pub. Date: Oct. 19, 2017

(65) Prior Publication Data
US 2019/0128533 A1    May 2, 2019

(30) Foreign Application Priority Data
Apr. 11, 2016  (EP) .................................... 16164673
Aug. 2, 2016   (EP) .................................... 16182426

(51) Int. Cl.
*F24C 15/02* (2006.01)
*H02G 11/00* (2006.01)
(Continued)

(52) U.S. Cl.
CPC ........ *F24C 15/028* (2013.01); *A47L 15/4261* (2013.01); *F24C 15/02* (2013.01);
(Continued)

(58) Field of Classification Search
CPC .... F24C 15/028; F24C 15/02; A47L 15/4261; A47L 15/4257; H02G 11/00; E05D 11/0081; E05F 1/1261; E05F 1/1276
See application file for complete search history.

(56) References Cited

U.S. PATENT DOCUMENTS 2,522,989 A    9/1950  Carbary et al.
2,665,414 A *  1/1954  Hubacker ............. F25D 23/028
                                                      439/31
3,053,564 A *  9/1962  Evans ........................ B60J 5/04
                                                      49/167

FOREIGN PATENT DOCUMENTS

FR    2337446 A1    7/1977
GB    2069445 A     8/1981
JP    H01189422 A   7/1989

OTHER PUBLICATIONS

International Search Report and Written Opinion issued in corresponding application No. PCT/EP2017/058386 dated Aug. 16, 2017, 15 pages.

* cited by examiner

*Primary Examiner* — Brian W Jennison
(74) *Attorney, Agent, or Firm* — Pearne & Gordon LLP

(57) ABSTRACT

The present invention relates to a domestic appliance, particularly a cooking oven, comprising a chassis and a door hinged to the chassis at a rotating axis of the door, wherein the door comprises at least one door panel, at least one door frame attached at an inner side of the door panel, at least one electric or electronic unit attached inside or at the door, at least one electrically conducting cable for interconnecting
(Continued)

the electric or electronic unit to a control unit arranged at or in the chassis of the domestic appliance, at least one cable channel attached or attachable to the door frame for guiding a first section of the cable, and at least one cable tube arranged within the region of a rotating axis of the door for guiding a second section of the cable from the door frame to the chassis, wherein the cable tube comprises a main section, and a first end section for connecting the cable tube to the hinge-sided end of the door and a second end section for connecting the cable tube to the chassis, wherein the main section is connecting the first end section the second end section, and wherein at least one of the first end section and/or the second end section configured to be freely pivotable relative to a rotational axis (y) running essentially in parallel to the main section.

22 Claims, 9 Drawing Sheets

(51) Int. Cl.
*A47L 15/42* (2006.01)
*E05D 11/00* (2006.01)
*E05F 1/12* (2006.01)

(52) U.S. Cl.
CPC .......... *H02G 11/00* (2013.01); *A47L 15/4257* (2013.01); *E05D 11/0081* (2013.01); *E05F 1/1261* (2013.01); *E05F 1/1276* (2013.01); *E05Y 2400/654* (2013.01); *E05Y 2900/308* (2013.01)

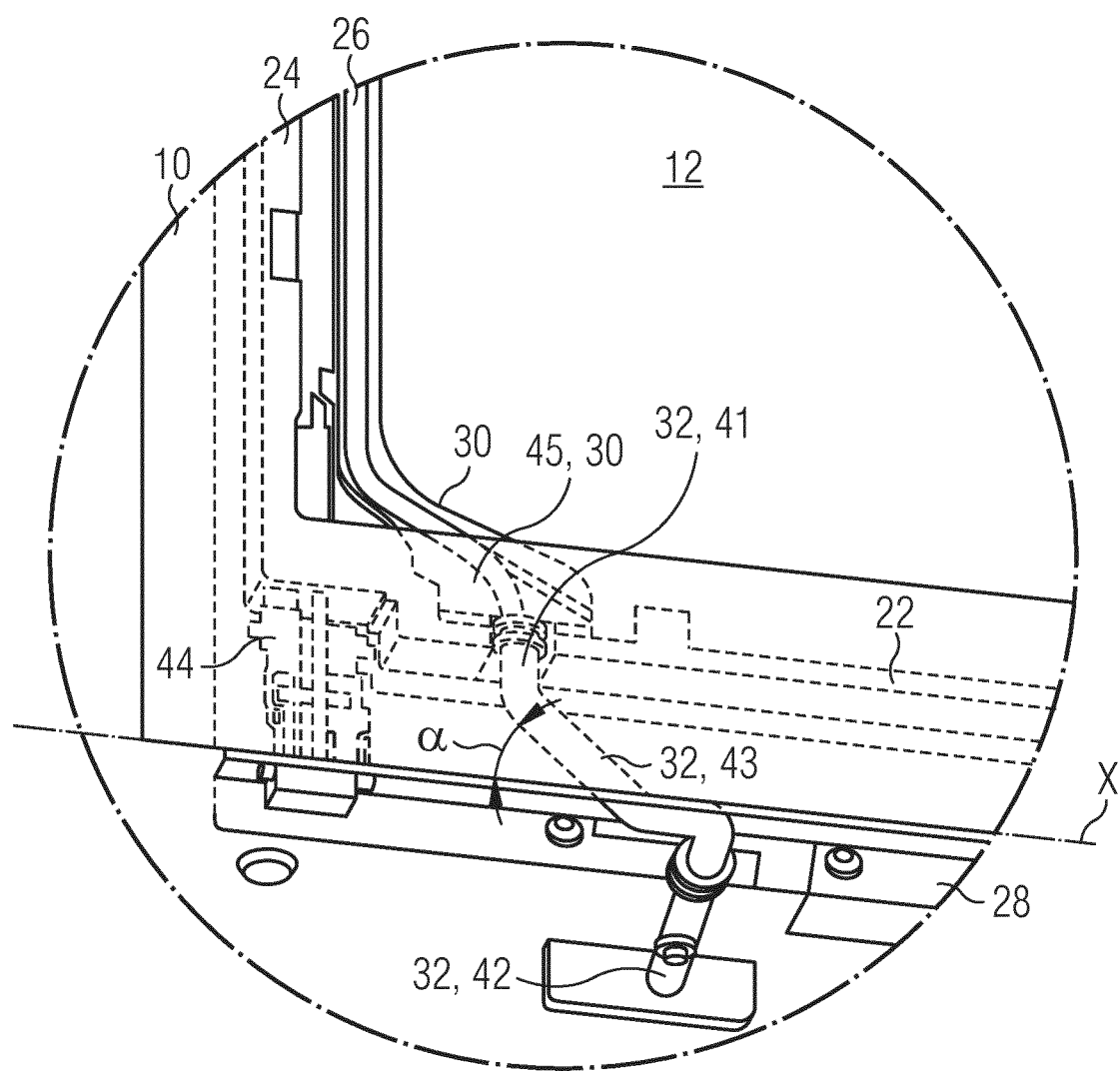

DOOR FOR A DOMESTIC APPLIANCE

The present invention relates to a domestic appliance, particularly a cooking oven, and further to a door for a domestic appliance.

Domestic appliances, e.g. cooking ovens, dishwashers, refrigerators and freezers, comprise usually a number of electric and electronic components. Said components are connected to power cables and/or control cables. Often, the electric and electronic components are arranged in or at a door of the domestic appliance and connected to the chassis of the domestic appliance via the cables. In this case, the one or more cables are routed through the door hinge or in other inconvenient manners, so that said cables are not exposed during opening the door. Further, the cables may be strained during opening the door. Moreover, the cables may be damaged due to the repetitive opening of the door.

Furthermore, a control unit, an indicator and/or a display device may be arranged in or at a door of the domestic appliance. The cables connected to the control unit, indicator and/or display device transfer power, control signals and data and must be protected against heat, humidity and deformation.

It is an object of the present invention to provide a door for a domestic appliance, which provides a safe arrangement of one or more cables interconnected between a component inside or at the door and a chassis of the domestic appliance.

According to the present invention a domestic appliance, particularly a cooking oven, comprises a chassis and a door. Said door is hinged to the chassis at a rotating axis (x) of the door. The door may thus be transferred from an open state to a closed state and vice versa, or additionally to any state there between by swinging the door around the rotating axis of the hinge(s). Depending on the positioning and arrangement of said hinge(s), the rotating axis (x) of the door may particularly be oriented substantially vertical or substantially horizontal.

Terms, which refer to a relative positioning of an object, for example "vertical", "horizontal", "frontal", or the like, preferably refer to the relative positioning referring to the domestic appliance positioned for its intended use.

The door according to the present invention and/or the door of an appliance according to the present invention comprises
- at least one door panel,
- at least one door frame attached at an inner side of the door panel,
- at least one electric or electronic unit attached inside or at the door,
- at least one electrically conducting cable for interconnecting the electric or electronic unit to a control unit arranged at or in the chassis of the domestic appliance,
- at least one cable channel attached or attachable to the door frame for guiding a first section of the cable, and, particularly for guiding the first section of the cable along a, preferably vertical, section of the door frame towards a hinge-sided end of the door.

The door further comprises at least one cable tube arranged within the region of a rotating axis of the door for guiding a second section of the cable from the door frame to the chassis.

According to the present invention the cable tube comprises a main section, and a first end section for connecting the cable tube to the hinge-sided end of the door and a second end section for connecting the cable tube to the chassis, wherein the main section is connecting the first end section and the second end section, and wherein at least one of the first end section and/or the second end section configured to be freely pivotable relative to a rotational axis running essentially in parallel to the main section.

In a preferred embodiment the main section is connecting the first end section and the second end section that are respectively oriented in separate, essentially parallel planes to provide a z-like structure of the cable tube. Additionally or alternatively, at least one of the first end section and/or the second end section is configured to be pivotable, preferably freely pivotable, relative to a rotational axis running essentially in parallel to the main section and essentially equidistantly to said second end section or to said first end section, respectively.

Particularly, the cable may be for interconnecting between the electric or electronic unit and a chassis of the domestic appliance.

Particularly, the at least one cable tube may be configured and arranged as a continuation of the cable channel and/or connected or connectable to the chassis of the domestic appliance.

Moreover, the cable tube may preferably be arranged within the range of the rotating axis of the door.

Particularly, the cable tube may preferably be of double bend shape, particularly S- or Z-shaped.

Preferably the cable penetrates the cable channel and the cable tube.

The core of the present invention is the cable tube, which comprises a main section, and a first end section for connecting the cable tube to the hinge-sided end of the door and a second end section for connecting the cable tube to the chassis. Particularly, the main section is connecting the first end section and the second end section such that at least one of the first end section and/or the second end section is freely pivotable relative to a rotational axis running essentially in parallel to the main section. The cable tube is arranged within the region of a rotating axis (x) of the door (10), particularly in the range of a rotating axis of the door. The cable tube allows a very smooth movement of the cable without any mechanical stress during opening and closing the door. During repetitive opening and closing the door the cable makes only very small torsion movement, but not any bending movement. The cable tube allows that the cable can withstand repetitive openings up to 100,000 cycles. The cable tube may be fixed at the door or at the chassis of the domestic appliance. The cable tube protects the cable against heat, humidity and deformation. The cable tube may be preassembled at the cable, which allows a fast assembling. Partitularly, the first and/or second end section is for connecting the cable tube to the door or the chassis, respectively, and may be configured to be attached or attachable to an opening of the door or chassis, respectively.

Particularly, the present invention allows for a torsion of the cable along its longitudinal axis. This advantageously may raise the lifetime of the cable compared to respective cables of doors of the prior art, which are bending or buckling orthogonal to the longitudinal axis, particularly during a door opening and/or closing cycle. The free pivoting of the first end section and/or of the second end section of the cable tube and hence of the corresponding sections of the cable relative to a rotational axis running essentially in parallel to the main section of the cable tube, and hence to the corresponding section of the cable, effectively avoids any repeated angular bending of the cable in a plane that could lead to material tiring or material fatigue of the metal cable and hence to an undue shortening of its lifetime due to repeated opening and closing of the door.

In a preferred embodiment the at least one cable channel is formed as part of the door frame or attached to the door frame.

In a further preferred embodiment the cable channel comprises a broadening end, particularly a broadened section, preferably at its end directed to a hinge-sided end of the door.

In a further preferred embodiment the main section of the cable tube is arranged substantially parallel to the rotating axis of the door. Alternatively, the main section 43 of the cable tube 32 is arranged substantially inclined with a sharp angle to the rotating axis (x) of the door. The sharp angle being preferably from 1° to 90°, more preferably from 1° to 75°, still more preferably from 1° to 45°, still more preferably from 15° to 75°, still more preferably from 25° to 50°.

In a further preferred embodiment the first end section is arranged more distant from a door hinge, particularly the nearest door hinge, than the second end section. In an alternatively preferred embodiment the second end section is arranged more distant from a door hinge, particularly the nearest door hinge, than the first end section.

In a further preferred embodiment, particularly in a state of a closed door, the second end section is arranged substantially perpendicular to the at least one door panel.

In a further preferred embodiment, particularly in a state of an open door, the second end section is arranged substantially parallel to the main plain of at least one door panel.

In a further preferred embodiment, particularly in a state of a closed door, the first end section is arranged substantially parallel to the at least one door panel, particularly a main plane of said door panel. In a further preferred embodiment, particularly in a state of an open door, the first end section is arranged substantially parallel to the main plane at least one door panel.

In a further preferred embodiment, particularly in a state of a closed door, the cable tube is arranged such that the main section is guiding the cable away from a door hinge, particularly the nearest door hinge and/or the first end section. In a further preferred embodiment, particularly in a state of a closed door, the cable tube is arranged such that the second end section is guiding the cable away from the door panel and/or the main section.

In a further preferred embodiment, particularly in a state of an open door, the cable tube is arranged such that the main section is guiding the cable away from a door hinge, particularly the nearest door hinge and/or the first end section. In a further preferred embodiment, particularly in a state of an open door, the cable tube is arranged such that the second end section is guiding the cable away from the door panel and/or the main section.

In a preferred embodiment the cable tube, particularly the main section and/or the first end section and/or the second end section is made of an elastic material, preferably rubber or silicone.

In particular, the material of the cable tube has hardness between 30 and 60 Shore, preferably between 40 and 50 Shore.

According to a further embodiment of the present invention, the domestic appliance, particularly the cooking oven, comprises a chassis and a door hinged to the chassis around a rotating axis of the door, wherein the door comprises
- at least one door panel,
- at least one door frame attached at an inner side of the door panel,
- at least one electric or electronic unit attached inside or at the door,
- at least one electrically conducting cable for interconnecting the electric or electronic unit to a control unit arranged at or in the chassis of the domestic appliance,
- at least one cable channel attached or attachable to the door frame for guiding a first section of the cable,
- at least one routing cable tube arranged or arrangeable within the chassis for guiding a second section of the cable within said chassis, and
- the first section and second section of the cable are connected or connectable by a connector, wherein the routing cable tube includes an opening at the front side of the chassis and extends towards the control unit arranged at or in the chassis, and wherein the cable enters the opening of the routing cable tube, and wherein an inner diameter of the routing cable tube is bigger than the outer diameters of the cable and the connector.

The further embodiment of the present invention provides a routing system for a pre-terminated cable extending from the door to the control unit.

Further, a door handle may be attached at an outer side of an outer door panel.

For example, the electric or electronic unit is arranged between the door handle and the door panel.

The at least one cable may be provided for transferring electric power, control signals and/or data.

Furthermore, the door frame may include an upper frame part, a lower frame part and two lateral frame parts.

In particular, the cable channel includes a U-shaped profile part, wherein preferably an open side of said U-shaped profile part lies against an inner side of the door panel. Alternatively, the open side of the U-shaped profile part may lie against an outer side of an inner door panel.

Moreover, the cable channel may include a plurality of snap-fits extending outwards and perpendicular to the longitudinal axis of said cable channel.

Further, at least one frame part of the door frame may include a plurality of slots corresponding with the snap-fits of the cable channel, so that the cable channel is attachable at said frame part of the door frame.

For example, the cable channel is attached or attachable at one or both of the lateral frame parts of the door frame.

In the preferred embodiment, the cable channel is arranged or arrangeable within the door frame.

In particular, a plurality of bulges is formed in the cable channel, wherein said bulges are provided for fixing and/or pre-assembling the cable within the cable channel.

Preferably, the bulges are arranged in a zigzag course along the longitudinal axis of the cable channel.

Further, the present invention relates to a door for a domestic appliance, in particular a door of a cooking oven.

It will be immediately understood by a skilled person that any feature, effect or advantage described herein with regard to a door according to the domestic appliance of the present invention may also be understood as a feature, effect or advantage of the domestic appliance of the present invention, and vice versa.

Novel and inventive features of the present invention are set forth in the appended claims.

The present invention will be described in further detail with reference to the drawing, in which FIGS. 1A and 1B illustrate a schematic perspective front view of a cooking oven with an oven door according to a preferred embodiment of the present invention, and a detailed view thereof FIG. 2 illustrates a schematic perspective view of the oven door according to the preferred embodiment of the present invention, FIG. 3 illustrates a further schematic perspective view of the oven door according to the preferred embodiment of the present invention, FIG. 4 illustrates a detailed schematic perspective view of the oven door according to the preferred embodiment of the present invention, FIG. 5 illustrates a detailed schematic perspective view of a cable tube according to the preferred embodiment of the present invention, FIG. 6 illustrates a schematic detailed perspective front view of the cooking oven with the oven door according to a further embodiment of the present invention, FIG. 7 illustrates a schematic detailed sectional side view of the cooking oven with the oven door according to the further embodiment of the present invention, FIG. 8 illustrates a schematic detailed perspective rear view of the cooking oven with the oven door according to the further embodiment of the present invention, and FIG. 9 illustrates a schematic detailed perspective side view of the cooking oven with the oven door according to the further embodiment of the present invention.

FIG. 1B illustrates a detailed view of the encircled section of FIG. 1A.

Figure 1A:
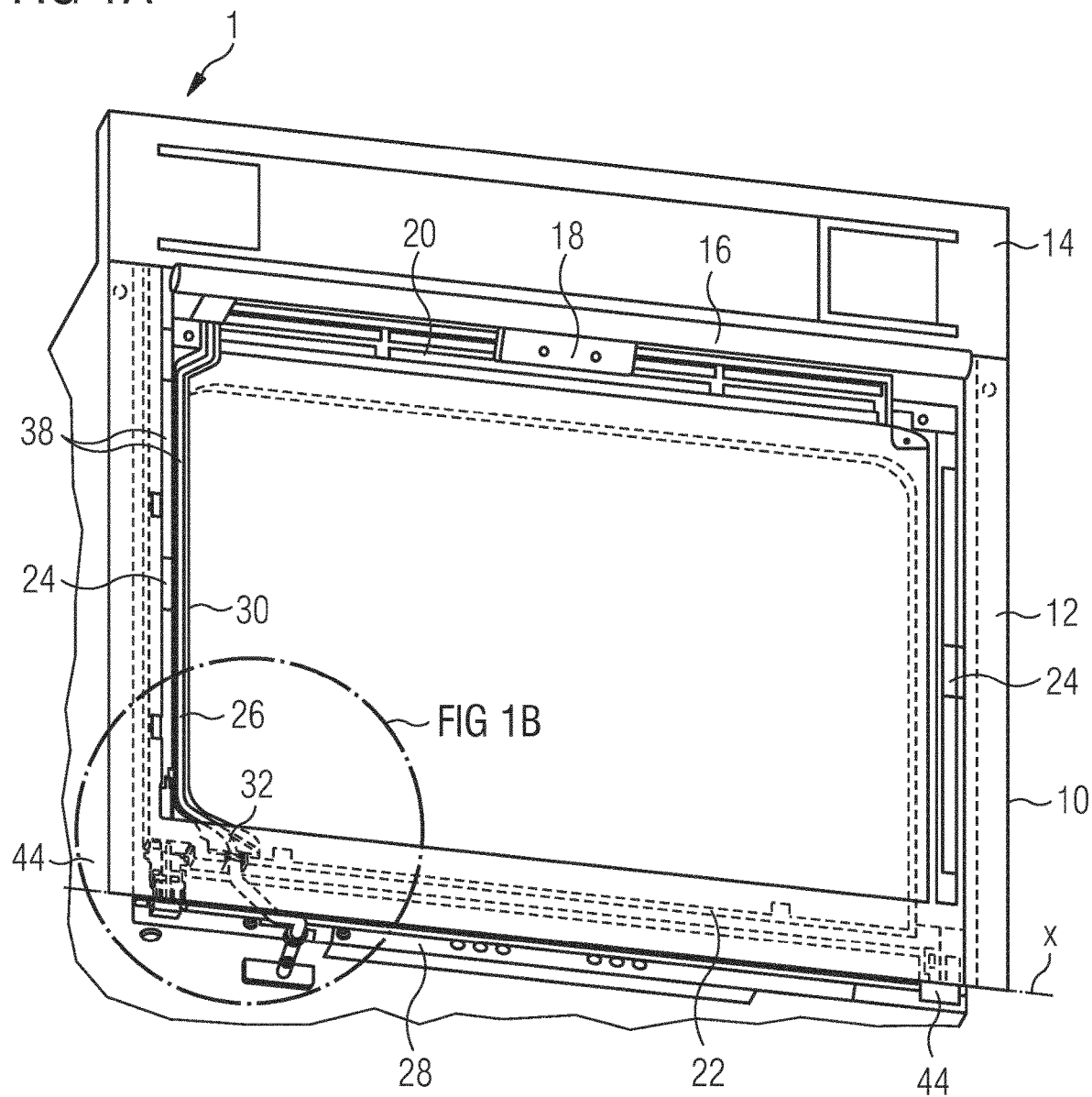
FIG. 1A illustrates a schematic perspective front view of a domestic appliance 1, here a cooking oven, with an oven door 10 according to a preferred embodiment of the present invention. In general, the present invention relates to a door for an arbitrary domestic appliance.

The oven door 10 comprises a door panel 12. In a closed state of the oven door 10 a front panel 14 of the cooking oven is arranged above the door panel 12, wherein the front panel 14 and the door panel 12 form a common plane. Further, the oven door 10 comprises a door handle 16 attached at an outer side of the door panel 12. The term "outer side" of the door panel 12 is defined as the side opposite to an oven cavity, while a term "inner side" of the door panel 12 relates to a side facing said oven cavity. Moreover, the oven door 10 comprises an electric unit 18 arranged between the door panel 12 and the door handle 16. In general, the oven door 10 may comprise one or more electric units 18 arranged inside or at the oven door 10.

In FIG. 1 the door panel 12 is represented transparently, so that the inner side of the oven door 10 is visible. In general, the door panel 12 may be transparent, semi-transparent or non-transparent. The oven door 10 comprises a door frame attached at the inner side of the door panel 12. The door frame includes an upper frame part 20, a lower frame part 22 and two lateral frame parts 24. In this example, the upper frame part 20, the lower frame part 22 and the lateral frame parts 24 are formed as profile parts in each case.

A cable 26 is led from the electric unit 18 into the chassis 28 of the cooking oven. The cable 26 may be provided for transferring electric power, control signals and/or data. The cable 26 is guided in a cable channel 30 and a cable tube 32. The cable channel 30 is attached at the inner side 26 of the door panel 12 and besides one of the lateral frame parts 24 of the door frame. A plurality of bulges 38 is formed inside the cable channel 30. Said bulges 38 are arranged in a zigzag course along the longitudinal axis of the cable channel 30. The bulges 38 press the cable 26 at the cable channel 30. The cable tube 32 is interconnected between the lower frame part 22 of the door frame and the chassis 28 of the cooking oven. The cable tube 32 is Z-shaped and protects the cable 26. The cable tube 32 allows a very smooth movement of the cable 26 without any mechanical stress during opening and closing the oven door 10. During repetitive opening and closing the oven door 10 the cable 26 makes only very small torsion movement, but not any bending movement. The cable tube 32 allows that the cable 26 can withstand repetitive openings up to 100,000 cycles.

Figure 5:
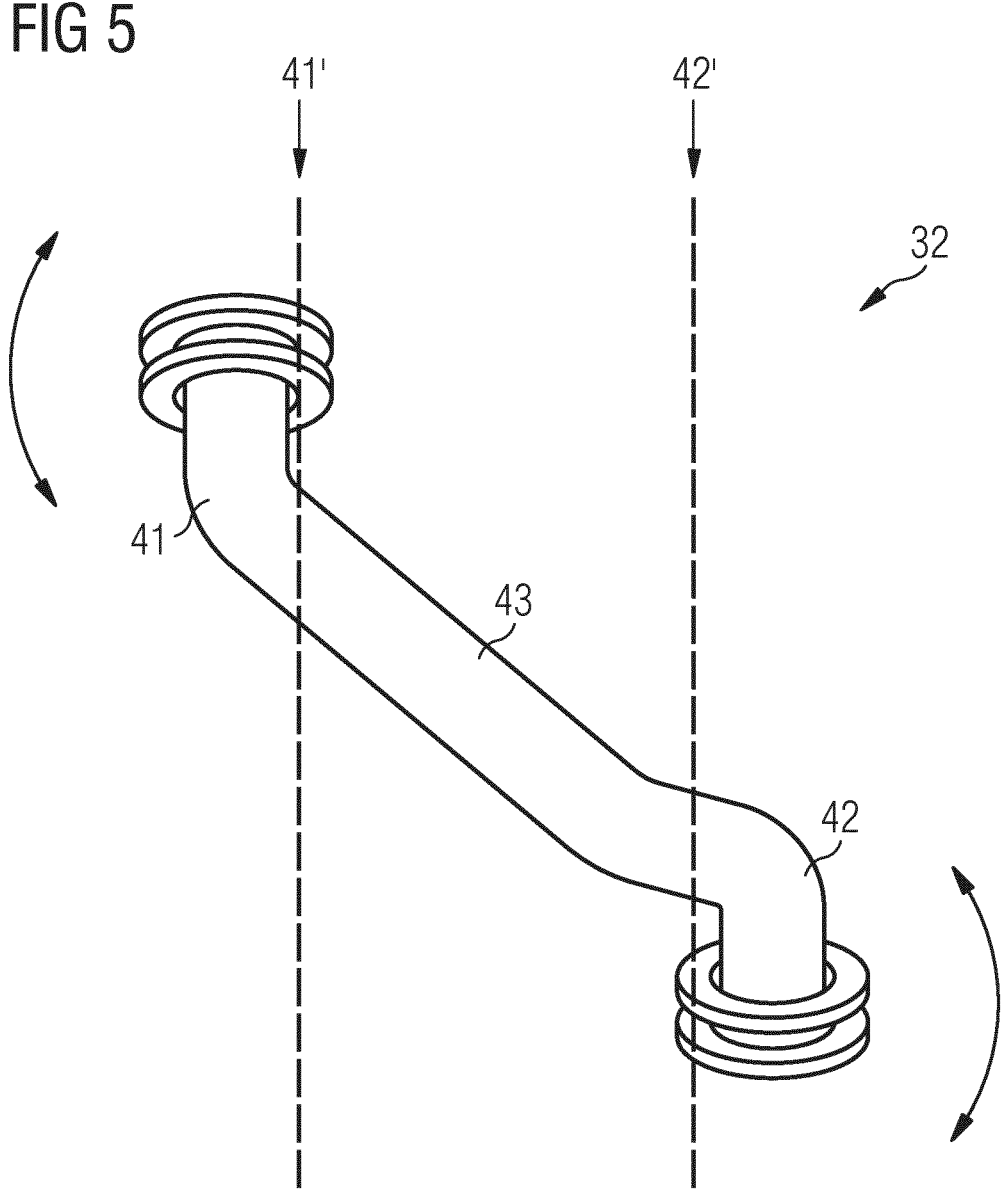

The cable tube 32 may be best seen from FIG. 5, which shows a detailed schematic perspective view of the cable tube 32. The cable tube 32 comprises a main section 43, a first end section 41 for connecting the cable tube 32 to the hinge-sided end of the door 10 and a second end section 42 for connecting the cable tube 32 to the chassis 28, wherein the main section 43 is connecting the first end section 41 and the second end section 42. The first end section 41 and the second end section 42 are preferably bended away from the main section 43. As shown in FIG. 5, the first end section 41 and the second end section 42 can be arranged to face away from each other thereby facilitating their respective connection to the hinge-sided end of the door 10 and to the chassis 28. The main section 43 with its longitudinal extension essentially defines the rotation axis y, relative to which at least one, preferably both, the first end section 41 and the second end section 42 freely pivot during the opening and closing movements of the door, thereby effectively avoiding any undue angular bending in a plane of the cable tube 32 and hence of the conducting cable 26 running through it. Preferably, the cable tube 32 is made of an elastic material in order to enable said freely pivoting movement of the at least one end section relative to the main section 32 without the need to provide any mechanical rotational bearing between the main section 43 and the first end section 41 or the second end section 42.

Particularly it may be seen from FIG. 1A and FIG. 1B that a domestic appliance 1, here in the form of a cooking oven 1, is provided, which comprising a chassis 28 and a door 10 hinged to the chassis 28 at the hinges 44 around the rotating axis (x) of the door 10. The door 10 comprises at least one door panel 12, at least one door frame 20, 22, 24 attached at an inner side of the door panel 12, at least one electric or electronic unit 18 attached inside or at the door 10 point at least one electrically conducting cable 26 is provided for interconnecting the electric or electronic unit 18 to a control unit 19 which may be arranged at or in the chassis 28 or the body of the domestic appliance 1.

At least one cable channel 30 is attached to the door frame 20, 22, 24 for guiding first section of the cable 26. Moreover, at least one cable tube 32 is arranged near the hinge sided end of the door 10, particularly within the region of the rotating axis x of the hinges 44. The cable tube 32 is for guiding a second section of the cable from the door frame 20, 22, 24 to the chassis 28.

The cable tube 32 comprises a main section 43, and the first end section 41 for connecting the cable tube 32 to the hinge sided end of the door 10, and a second end section 42 for connecting the cable tube 32 to the chassis 28, wherein the main section 43 is connecting the first end section 41 and the second end section 42. Moreover, at least one of the end sections 41, 42 is configured to be freely pivotable relative to the main section 43.

As may be particularly seen from FIG. 1B the at least one cable channel 30 is attached to the door frame 20, 22, 24.

The cable channel 30 comprises a broadening end 45, preferably at its end directed to a hinge-sided end of the door 10. The main section 43 of the cable tube 32 is arranged substantially inclined with a sharp angle to the rotating axis (x) of the door. Moreover, in the shown state of a closed door 10, the second end section 42 is arranged substantially perpendicular to the at least one door panel 12 and the first end section 41 is arranged substantially parallel to the at least one door panel 12. Thereby, the cable tube 32 is arranged such that the main section 43 is guiding the cable 26 away from the left door hinge 44, which is the door hinge 44 being nearest to the cable tube 32. Additionally, the cable tube 32 is arranged such that the main section 43 is guiding the cable 26 away from the first end section 41 towards the second end section 42. The cable tube 32 is arranged such that the second end section 42 is guiding the cable 26 away from the door panel 12 and perpendicular to the door panel 12, towards the chassis 28. Thereby, the second end section 42 is guiding the cable 26 away from the main section 43.

The cable tube 32 is made of an elastic material, for example silicon or rubber. Preferably, the material of the cable tube 32 has a low hardness, e.g. between 30 and 60 Shore, preferably between 40 and 50 Shore. The cable tube 32 may be fixed at the oven door 10 or at the chassis 28 of the cooking oven at the lower frame part 22 of the oven door 10. The cable tube 32 may be preassembled at the cable 26, which allows a fast assembling.

The cable tube 32 protects the cable 26 against heat, humidity and deformation.

Figure 2:
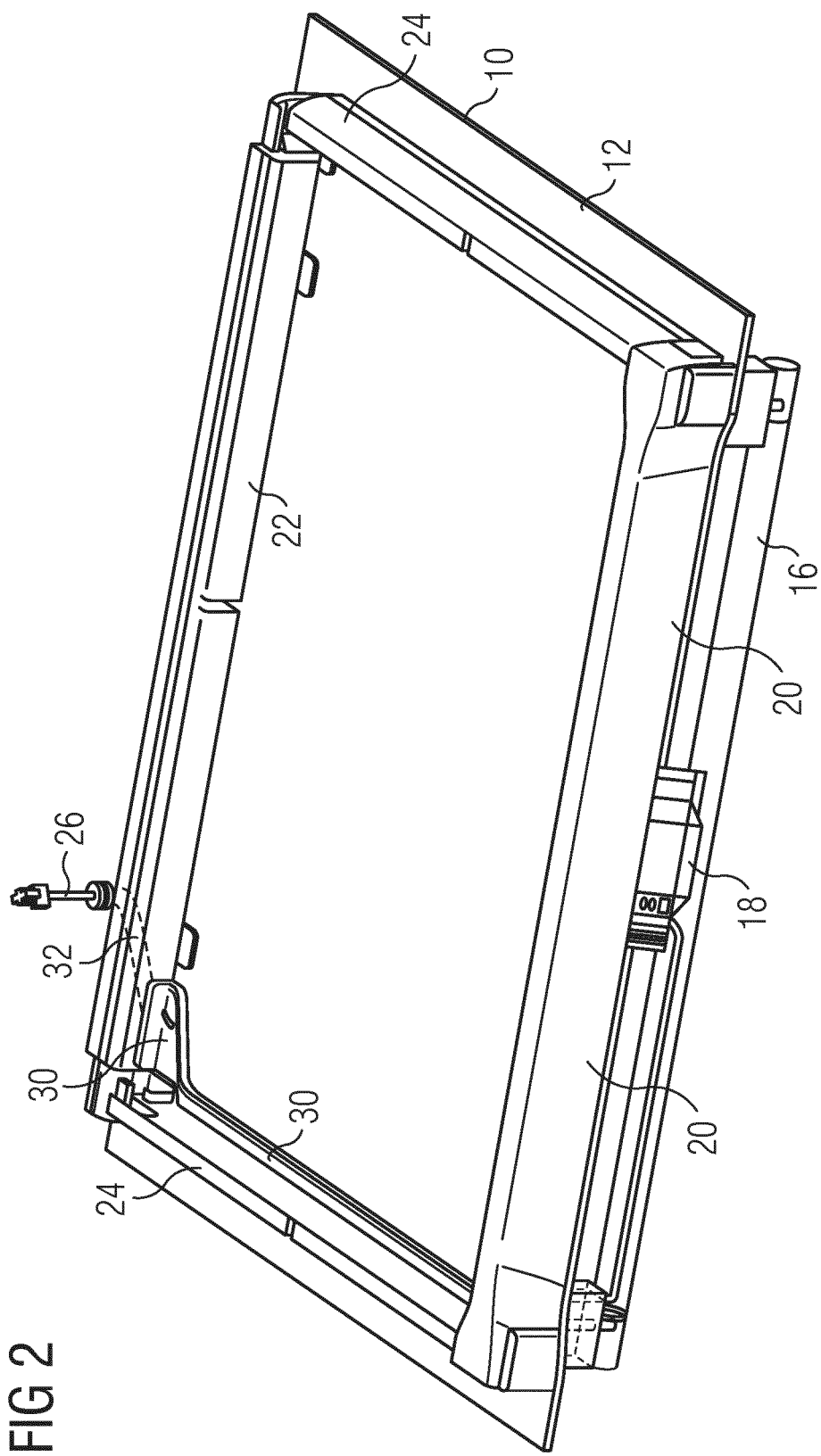

FIG. 2 illustrates a schematic perspective view of the oven door 10 according to the preferred embodiment of the present invention. In particular, FIG. 2 shows the inner side and upper portion of the oven door 10.

The oven door 10 comprises the door panel 12, the door handle 16 and the electric unit 18. The door handle 16 is attached at the outer side of the door panel 12. The electric unit 18 is arranged between the door panel 12 and the door handle 16. The door frame is attached at the inner side of the door panel 12, wherein said door frame includes the upper frame part 20, the lower frame part 22 and the two lateral frame parts 24. In this example, the upper frame part 20, the lower frame part 22 and the lateral frame parts 24 are formed as profile parts in each case.

The cable 26 is led from the electric unit 18 to the lower end of the oven door 10. The cable channel 30 is attached at the inner side 26 of the door panel 12 and besides one of the lateral frame parts 24 of the door frame. In this example, the cable channel 30 is arranged within the door frame. The cable tube 32 forms the continuation of the cable channel 30. The cable 26 penetrates the cable channel 30 and the cable tube 32.

Figure 3:
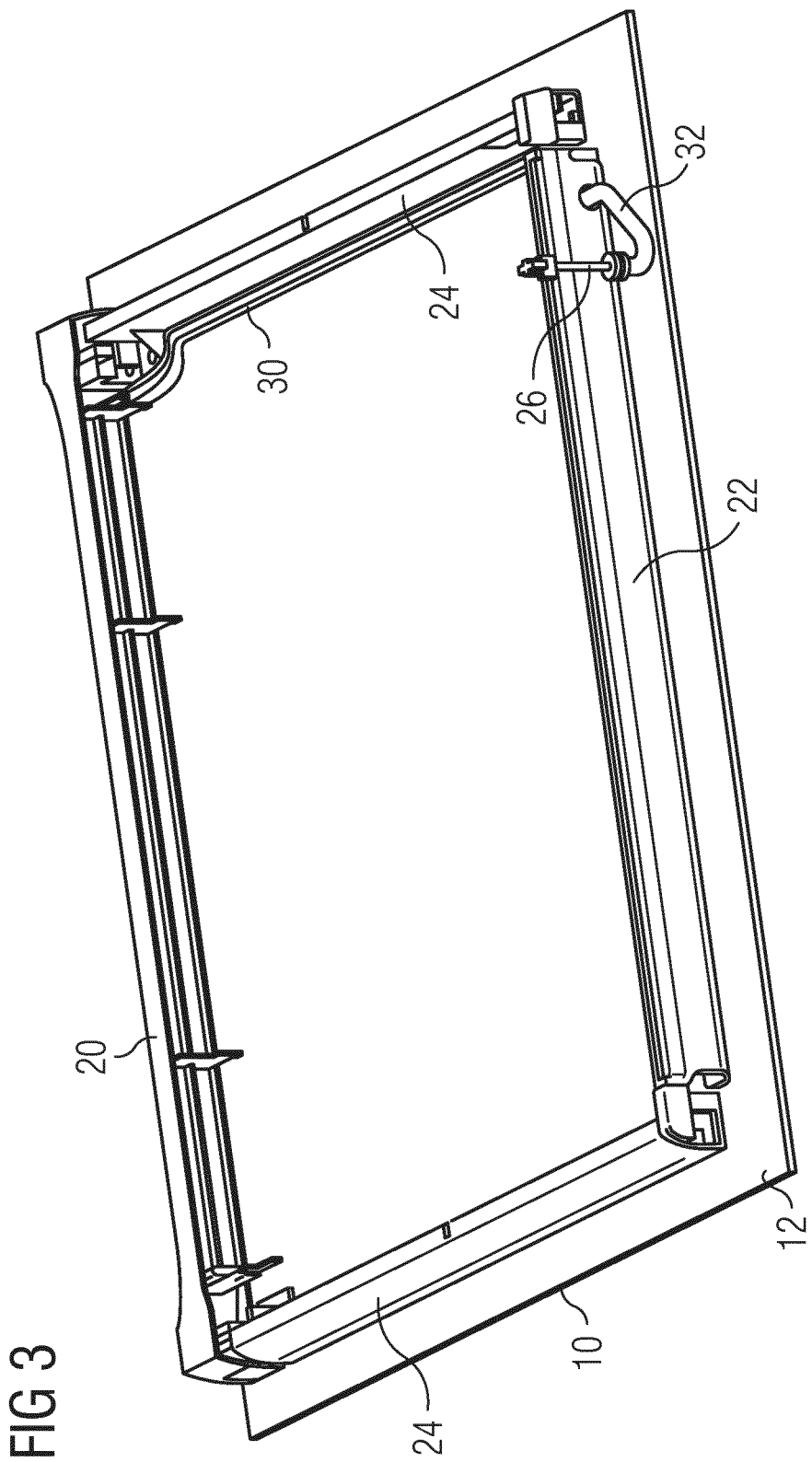

FIG. 3 illustrates a further schematic perspective view of the oven door 10 according to the preferred embodiment of the present invention. In particular, FIG. 3 shows the inner side and lower portion of the oven door 10.

The door frame is attached at the inner side of the door panel 12. Said door frame includes the upper frame part 20, the lower frame part 22 and the two lateral frame parts 24 formed as profile parts in each case. The cable channel 30 is attached at the inner side 26 of the door panel 12 and besides one of the lateral frame parts 24 of the door frame. In this example, the cable channel 30 is arranged within the door frame. The cable tube 32 forms the continuation of the cable channel 30. The cable 26 penetrates the cable channel 30 and the cable tube 32.

Figure 4:
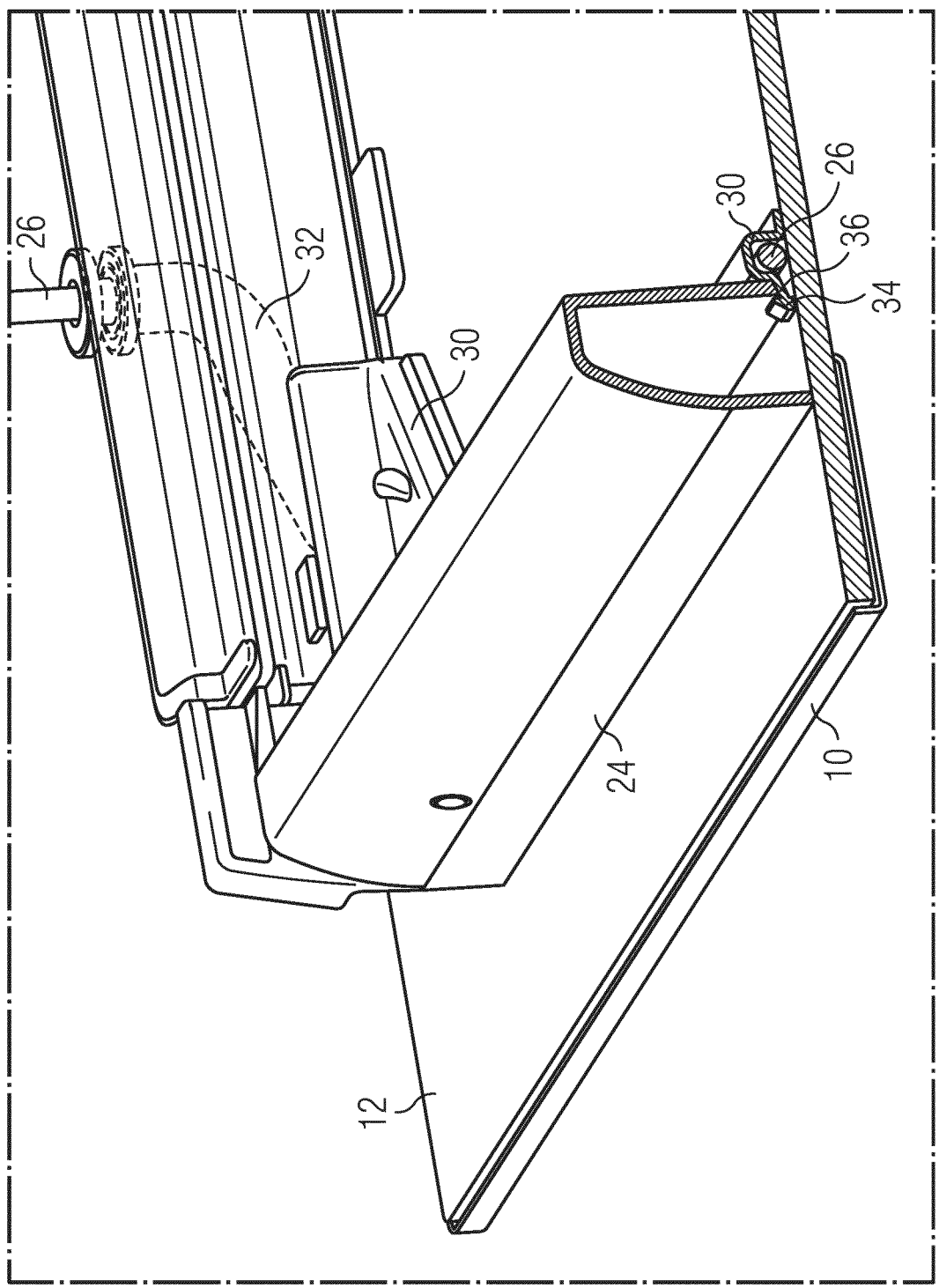

FIG. 4 illustrates a detailed schematic perspective view of the oven door 10 according to the preferred embodiment of the present invention. FIG. 4 shows one lower corner of the oven door 10. In particular, FIG. 4 clarifies the attachment of the cable channel 30 at the later frame part 24.

The cable channel 30 includes a plurality of snap-fits 34. Said snap-fits extend perpendicular to the longitudinal axis of the cable channel 30. The lateral frame part 24 includes a plurality of slots 36 corresponding with the snap-fits 34 of the cable channel 30. The cable channel 30 can be easily assembled by the snap-fits 34 and the slots 36. The cable channel 30 is formed as a U-shaped profile part, wherein the open side of said U-shaped profile part lies against the door panel 12. Thus, the cable 26 is completely enclosed by the cable channel 30 and the door panel 12. The cable tube 32 forms the continuation of the cable channel 30.

FIG. 5 illustrates a detailed schematic perspective view of the cable tube 32 according to the preferred embodiment of the present invention. FIG. 5 clarifies the geometric structure of the cable tube 32.

The cable cube 32 comprises the main section 43, the first end section 41 and the second end section 42. The first end section 41 is provided for connecting the cable cube 32 to the hinge sided end of the door 10, while the second end section 42 is provided for connecting the cable tube 32 to the chassis 28. The main section 43 is connecting the first end section 41 and the second end section 42.

Figure 6:
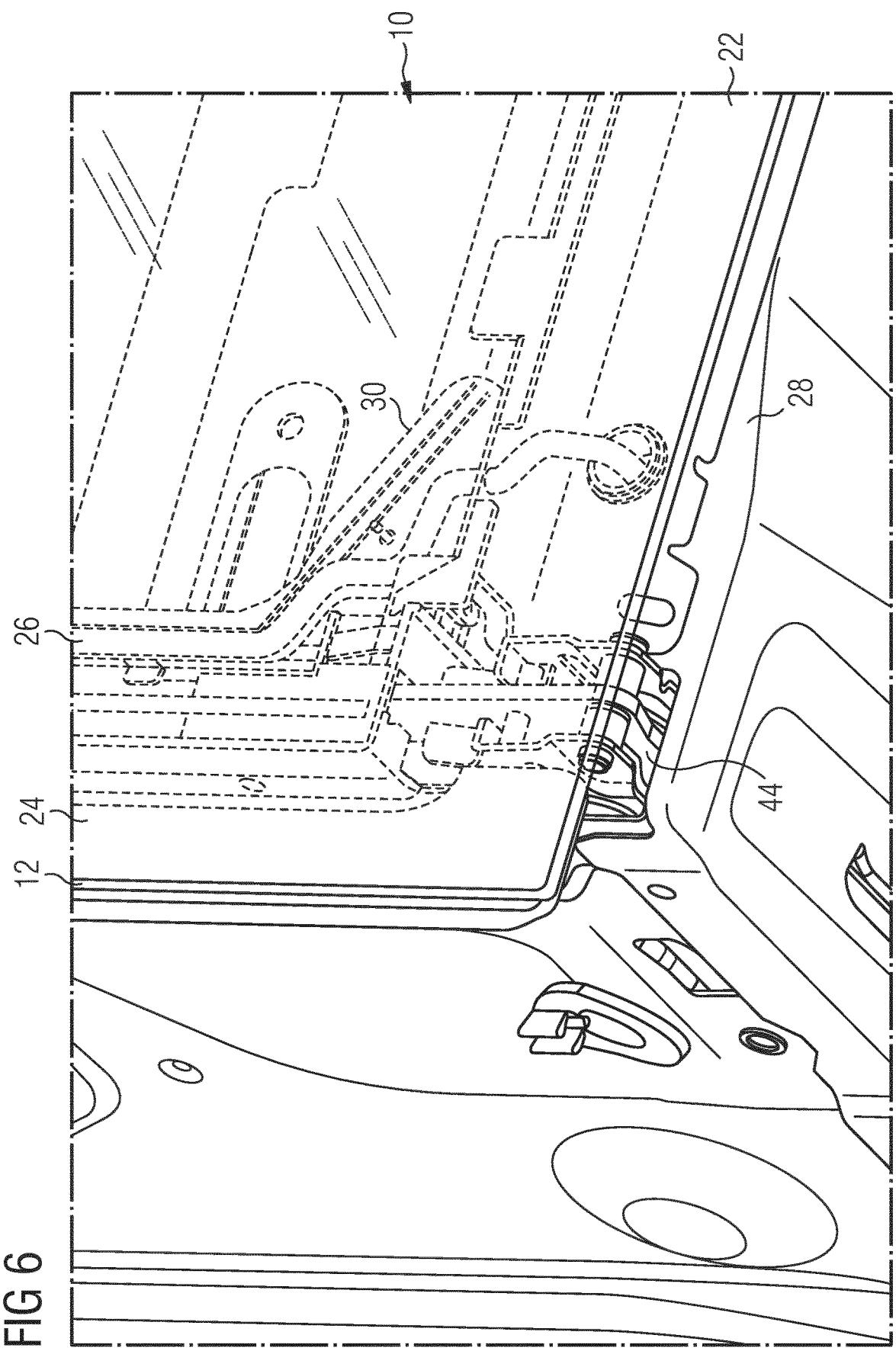

FIG. 6 illustrates a schematic detailed perspective front view of the cooking oven 1 with the oven door 10 according to a further embodiment of the present invention. Said further embodiment provides a cable routing system.

In FIG. 6 the door panel 12 is represented transparently, so that the inner side of said oven door 10 is visible. In general, the door panel 12 may be transparent, semi-transparent or non-transparent. The oven door 10 comprises the door frame attached at the inner side of the door panel 12. The door frame includes the upper frame part 20, the lower frame part 22 and the both lateral frame parts 24. In FIG. 6, only the lower frame part 22 and one of the lateral frame parts 24 are shown.

The cable 26 is led from the electric unit 18 into the chassis 28 of the cooking oven 1. The cable 26 may be provided for transferring electric power, control signals and/or data. The cable 26 is guided in the cable channel 30 and in a routing cable tube 46. The cable channel 30 is attached at the inner side 26 of the door panel 12 and besides one of the lateral frame parts 24 of the door frame. The plurality of bulges 38 is formed inside the cable channel 30, wherein said bulges 38 are arranged in a zigzag course along the longitudinal axis of the cable channel 30. The bulges 38 press the cable 26 at the cable channel 30.

A routing cable tube 46 is fixed at the front of the chassis 28. The routing cable tube 46 includes an opening at the front of the chassis 28. The cable 26 enters the opening of the routing cable tube 46. The routing cable tube 46 is made of one or more components. Preferably, the routing cable tube 46 is made of plastic material. The routing cable tube 46 allows a very smooth movement of the cable 26 during opening and closing of the oven door 10 without any mechanical cable stress. Further, during repetitive opening of the oven door 10 the cable 26 makes only a very short axial movement and bending movement.

Further, a layer for the cable 26 is disposed on the cable channel 30. Said layer protects the cable 26 at the door side from factors such as oven heat, humidity, etc. so as not to be deformed as well. The cable 26 supplies energy and transfers data to the oven door 10, comes out from the front side of the chassis 28, enters the oven door 10 and extends along the side door profile up to the electrical load.

Moreover, the cable channel 30 may be very easily assembled onto the lateral frame part 24 of the oven door 10 by means of clips or hooked profiles, which are arranged on an opposite side of said lateral frame part 24. For example, the lateral frame part 24 includes slots, in which the hooks or clips are interfering. Further, the cable channel 30 may include a groove with a number of small bowls for keeping pressed the cable 26 onto the cable channel 30. The cable channel 30 may be preassembled on the cable 26, which allows much a faster assembling. Moreover, the cable 26 is protected against pulling forces.

Preferably, the cable channel 30 may include an inner opening on a side opposite to the side of the front panel 12. Said inner opening is bigger than the outer diameter of the pre-terminated cable 26, so that the cable 26 can just be laid down on the inner side of the front panel 12 and close to the lateral frame part 24 during oven door assembling and covered by means of the cable channel 30, which just have to be pushed against the lateral frame part 24 and be clipped thereon. In particular, the cable channel 30 is made of temperature resistive, thermoplastic or thermosetting material and also covers and protects the cable wires which are extending to the electrical load.

Figure 7:
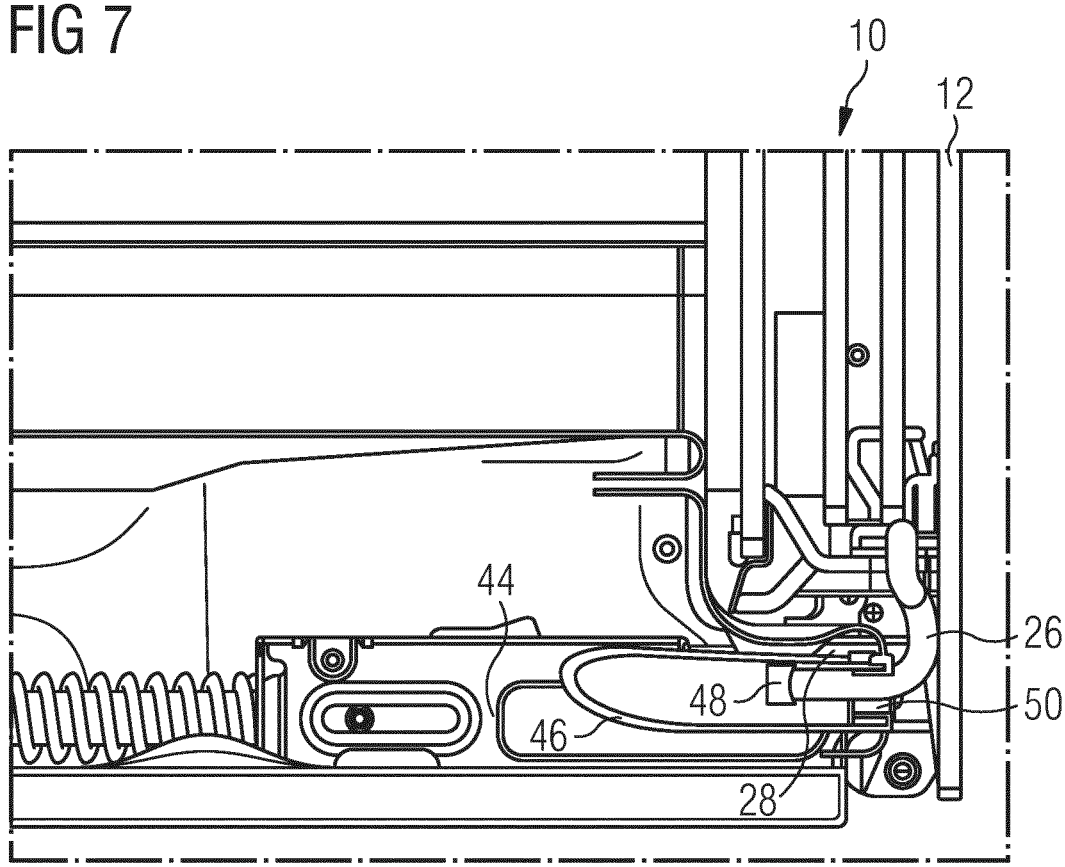

FIG. 7 illustrates a schematic detailed sectional side view of the cooking oven 1 with the oven door 10 according to the further embodiment of the present invention.

The inner diameter of the routing cable tube 46 is bigger than the outer diameter of the cable 26. Moreover, the inner diameter of the routing cable tube 46 is bigger than a connector 48 related to the cable 26. Preferably, the connector 48 is fixed at the end of said cable 26. For example, the connector 48 is a USB connector.

Since the inner diameter of the routing cable tube 46 is bigger than the outer diameter of the cable 26 and the connector 48, the cable 26 and the connector 48 are able to withstand a repetitive opening and closing of the oven door 10 up to 100.000 cycles as for example required for microwave appliances. The cable 26 is freely movable within the routing cable tube 48 and there is almost no friction contact between said cable 26 and routing cable tube 48. The big inner diameter of the routing cable tube 46 allows also a very easy assembling and connecting of the cable 26 to the control unit 19, which is arranged in the chassis 28.

A data and power transfer cable 26 can be made out of one part without any additional connectors in between and can be pushed with its connector 48 through the routing cable tube 46 up to the control unit 19, so that a data transfer between control unit 19 and power unit 18 can be realized without any disturbance.

Further, the routing of cable 26, which is already assembled with connectors 48, preferably on both of its ends, has the ad-vantages that the warranty on pre-terminated cables 26 remains, since the connectors 48 do not have to be cut and soldered again after entering the cables. Another advantage is that assembling can be performed subsequently, since the pre-assembled cable 26 can be installed at the end of the assembling of the cooking oven 1 on existing assembly lines. Thus, the oven door 10 with all related components as glass panes 12, door handle 16, electrical units 18 and pre-terminated cable 26 can be pre-assembled and brought to the assembly line and afterward a pre-terminated cable can be pushed through cable routing system and connected to a control unit 19. Such solutions allow a very fast and simple assembling as well as a very fast disassembling in service case.

Optionally, a grommet 50 is provided for matching the diameters of the cable 26 and the routing cable tube 46. Said grommet 50 may be made of metal, rubber, silicon or plastic.

Figure 8:
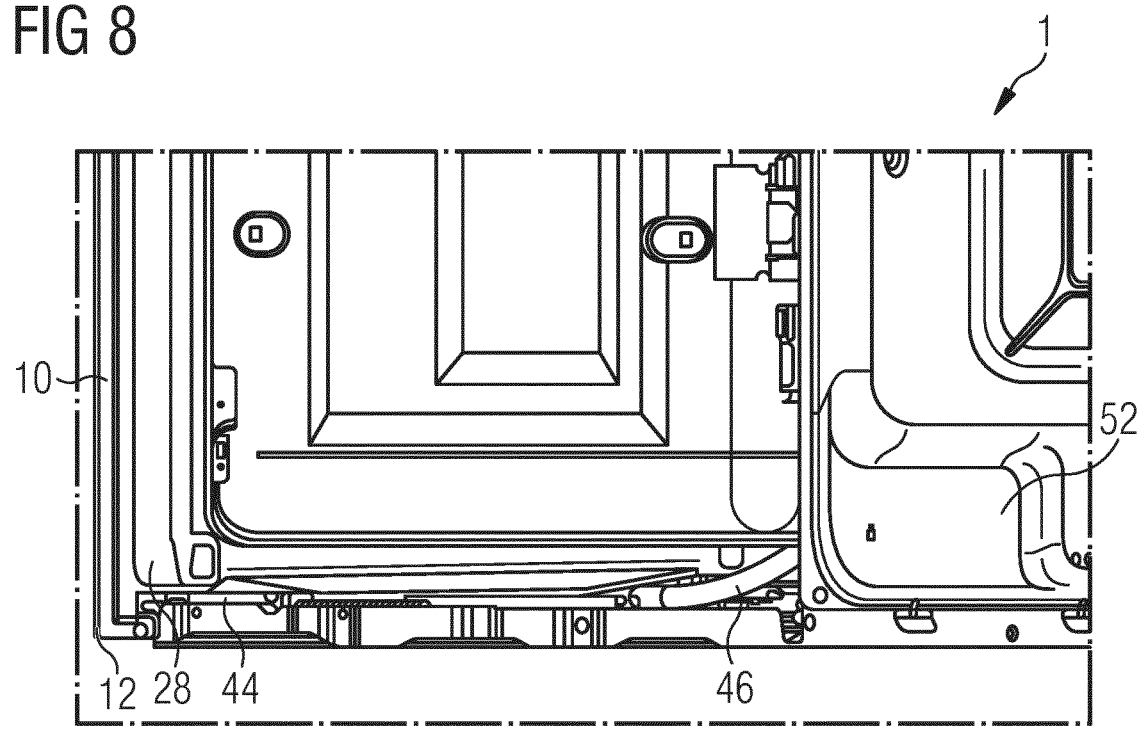

FIG. 8 illustrates a schematic detailed perspective rear view of the cooking oven 1 with the oven door 10 according to the further embodiment of the present invention. FIG. 8 shows a first part of the routing cable tube 46 that is fixed at the front of the chassis 28 and runs inside the chassis 28 beneath the oven cavity towards the control unit 19 that is arranged in a suitable position at or in the chassis 28. The path of the routing cable tube 46 towards the control unit 19 can continue to run entirely or partly within the chassis 28. In particular if the cable 26 is routed towards the control unit 19 in part on the external side of the chassis 28, the routing cable tube 46 can lead to an exit opening in a lateral side wall or in the rear wall 52 of the chassis 28. The routing cable tube 46 can either be fixed to said exit opening and end there, or in alternative the routing cable tube 46 can pass through said exit opening and continue to run towards the control unit 19 at least in part on the outside of the chassis 28. Said exit opening of the chassis 28 can comprise a grommet.

In a preferred embodiment, the routing cable tube 46 can be arranged between the front of the oven chassis 28 and a side wall of the cooking oven 1, so that an exit end of the routing cable tube 46 is fixed to an exit opening in said side wall of cooking oven 1, wherein the cable 26 may be routed along the external face of the side wall of the cooking oven 1 to the control unit 19.

In an alternative embodiment, the cable 26 may be routed from the front of the oven chassis 28 to the rear wall 52 of the cooking oven 1. The routing cable tube 46 can be arranged between the front of the oven chassis 28 and the rear wall 52, wherein an exit end of the routing cable tube 46 can be arranged at the rear wall 52 or wherein the routing cable tube 46 may run inside the oven chassis 28 along the bottom and the rear wall 52 of the cooking oven 1 towards the control unit 19.

Another advantage of the cable routing system is that a contact of the cable 26 with a component of the cooking oven 1 is pre-vented. Some components of the cooking oven 1 may be warmed up to more than 500° C. during a pyrolytic cycle. Furthermore, the cable 26 may be routed away from the oven cavity on the one hand, but on the shortest way to the control unit 19 on the other hand.

Preferably, the routing cable tube 46 may be placed between the front of the oven chassis 28 and the side wall of the cooking oven 1, so that an exit of the routing cable tube 46 is at the side wall of cooking oven 1 and the cable 26 may be routed along the side wall of the cooking oven 1 to the control unit 19. Further, the cable 26 may be arranged between the front chassis and a rear wall 52 of the cooking oven 1, so that the pre-terminated cable 26 can be routed along the bottom and rear wall 52 of the cooking oven 1 to the control unit 19. The pre-terminated cable 26 may be routed on the shortest way from the front of the chassis 28 to the control unit 19, wherein the routing cable tube 46 is arranged on the insulation of the oven cavity. Preferably, the routing cable tube 46 is made of plastic, aluminium or stainless steel tube or of a combination thereof.

Figure 9:
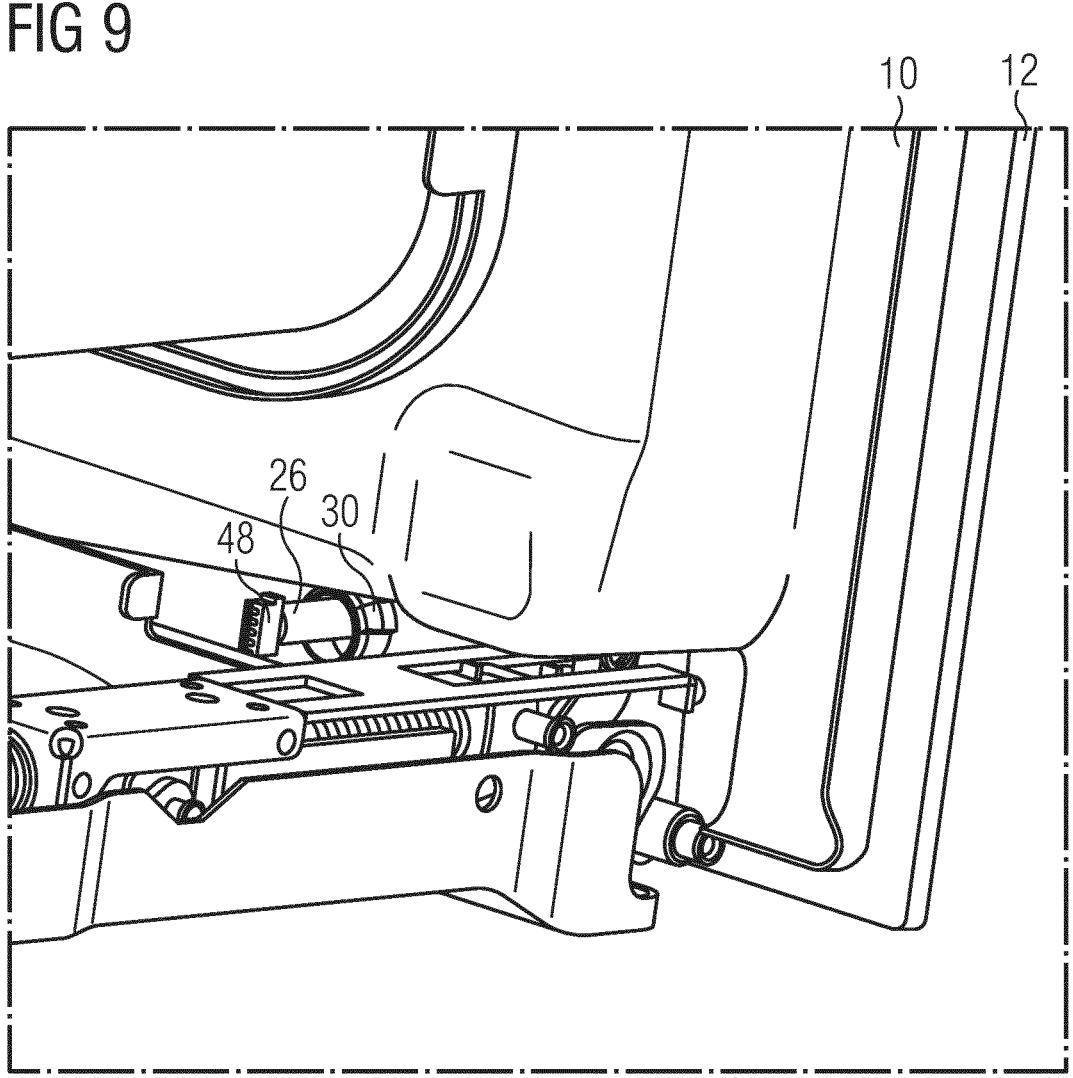

FIG. 9 illustrates a schematic detailed perspective side view of the cooking oven with the oven door according to the further embodiment of the present invention. FIG. 9 shows the connector 48 fixed at the end of the cable 26. For example, the connector 48 is a USB connector.

Although illustrative embodiments of the present invention have been described herein with reference to the accompanying drawings, it is to be understood that the present invention is not limited to those precise embodiments, and that various other changes and modifications may be affected therein by one skilled in the art without departing from the scope or spirit of the invention. All such changes and modifications are intended to be included within the scope of the invention as defined by the appended claims.

LIST OF REFERENCE NUMERALS

1 domestic appliance, in particular a cooking oven
10 oven door 12 door panel
14 front panel
16 door handle
18 electric unit
19 control unit
20 upper frame part
22 lower frame part
24 lateral frame part
26 cable
28 chassis
30 cable channel
32 cable tube
34 snap-fit
36 slot
38 bulge
41 first end section of cable tube
42 second end section of cable tube
43 connecting section
44 hinge
45 broadening end
46 routing cable tube
48 connector
50 grommet
52 rear wall
(x) rotating axis of door
(y) rotation axis of connecting section

The invention claimed is:

1. A domestic appliance, comprising a chassis and a door hinged to the chassis around a rotating axis of the door, wherein the door comprises:
a door panel,
a door frame attached at an inner side of the door panel,
an electric or electronic unit attached inside or at the door,
an electrically conducting cable for interconnecting the electric or electronic unit to a control unit arranged at or in the chassis of the domestic appliance,
a cable channel attached or attachable to the door frame for guiding a first section of the cable, and
a cable tube arranged within a region of the rotating axis of the door for guiding a second section of the cable from the door frame to the chassis,
wherein the cable tube comprises a continuous, closed tubular body having a main section, a first end section for connecting the cable tube to a hinge-sided end of the door, and a second end section for connecting the cable tube to the chassis, wherein the main section connects the first end section and the second end section, and
wherein at least one of the first end section or the second end section is configured to be freely pivotable relative to a rotational axis running essentially in parallel to the main section.

2. The domestic appliance according to claim 1, wherein at least one of the main section, the first end section, the second end section of the cable tube is made of an elastic material.

3. The domestic appliance according to claim 1, wherein the main section of the cable tube is arranged substantially inclined with a sharp angle to the rotating axis of the door.

4. The domestic appliance according to claim 1, wherein in a closed state of said door, the second end section is arranged substantially perpendicular to the door panel.

5. The domestic appliance according to claim 1, wherein in a closed state of said door, the first end section is arranged substantially parallel to the door panel.

6. The domestic appliance according to claim 1, wherein, a closed state of said door, the cable tube is arranged such that the main section guides the cable away from a door hinge and/or the first end section.

7. The domestic appliance according to claim 1, wherein in a closed state of said door, the cable tube is arranged such that the second end section guides the cable away from the door panel and/or the main section.

8. A domestic appliance according to claim 1, further comprising:
a routing cable tube arranged or arrangeable within the chassis for guiding a third section of the cable within said chassis,
wherein the routing cable tube includes an opening at a front side of the chassis and extends towards the control unit arranged at or in the chassis, and wherein the cable enters the opening of the routing cable tube, and wherein an inner diameter of the routing cable tube is bigger than the outer diameter of the cable.

9. The domestic appliance according to claim 1, wherein a frame part of the door frame includes a plurality of slots corresponding with snap-fits of the cable channel, so that the cable channel is attachable at said frame part of the door frame.

10. The domestic appliance according to claim 1, wherein the cable channel is formed as part of the door frame or attached to the door frame.

11. The domestic appliance according to claim 1, wherein the cable channel comprises a broadening end at its end directed to a hinge-sided end of the door.

12. The domestic appliance according to claim 1, wherein the cable channel is attached or attachable at a lateral frame part of the door frame.

13. The domestic appliance according to claim 1, wherein the cable channel is arranged or arrangeable within the door frame.

14. The domestic appliance according to claim 1, wherein a plurality of bulges is formed in the cable channel, wherein said bulges are provided for fixing and/or preassembling the cable within the cable channel.

15. The domestic appliance according to claim 14, said bulges being arranged in a zigzag course along a longitudinal axis of the cable channel.

16. A domestic appliance comprising a door hinged to a chassis and configured to rotate relative thereto about a rotating axis of the door, the door comprising a door frame and an electric unit, a cable tube interconnected between said chassis and a lower frame part of the door frame adjacent to said rotating axis of the door, a cable extending from said electric unit, through said cable tube into said chassis in order to communicate electrical signals, data or power between said electric unit and a controller in said chassis, said cable tube being made of elastic material and comprising a first end section connected to said lower frame part of the door frame, a second end section connected to said chassis, and a main section located between said first and second end sections, said cable tube having a double-bend configuration such that said first and second end sections thereof extend at respective angles relative to said main section generally away from one another, said main section extending along a longitudinal axis that is inclined relative to the rotating axis of said door, at least one of said first end section or said second end section of said cable tube being rotatable relative to said longitudinal axis of said main section upon rotation of said door about the rotating axis thereof, wherein undue angular bending of said cable tube in a plane of the tube is effectively avoided upon rotation of said door between closed and open positions thereof, and wherein said rotation of said door introduces torsional movement but no bending movement to said cable where said cable passes through said cable tube.

17. The domestic appliance according to claim 16, said door further comprising a cable channel attached to said door frame and conducting said cable through said door and into said first end section of said cable tube, said cable channel substantially enclosing said cable along its path from said electric unit to said cable tube.

18. The domestic appliance according to claim 16, said door further comprising a door panel, wherein in the closed state of said door said first end section of said cable tube is arranged substantially parallel to said door panel and said second end section of said cable tube is arranged substantially perpendicular to said door panel.

19. The domestic appliance according to claim 16, said first and/or second end sections of said cable tube being rotatable relative to said longitudinal axis of said main section via elasticity of said cable tube, said cable tube therefore excluding mechanical rotational bearings for accommodating said rotation.

20. The domestic appliance according to claim 16, wherein the cable tube comprises a continuous, closed tubular body that includes the first end section, second end section, and main section.

21. The domestic appliance according to claim 1, wherein the cable tube is S- or Z-shaped.

22. The domestic appliance according to claim 1, wherein the first end section and the second end section are both configured to be freely pivotable relative to the main section.

* * * * *